United States Patent [19]
Bray

[11] Patent Number: 5,838,442
[45] Date of Patent: Nov. 17, 1998

[54] DEVICE FOR DETERMINING THE SHAPE OF THE WAVE SURFACE REFLECTED BY A SUBSTANTIALLY PLANE COMPONENT

[75] Inventor: Michaël Bray, Olivet, France

[73] Assignee: Compagnie Industrielle Des Lasers Cilas, Paris, France

[21] Appl. No.: 883,398

[22] Filed: Jun. 26, 1997

[30] Foreign Application Priority Data

Jul. 10, 1996 [FR] France .................................. 96 08599

[51] Int. Cl.$^6$ ..................................................... G01B 9/02
[52] U.S. Cl. ........................................... 356/359; 356/360
[58] Field of Search ..................................... 356/359, 360

[56] References Cited

U.S. PATENT DOCUMENTS

| | | | |
|---|---|---|---|
| 3,338,130 | 8/1967 | Gaffard | 88/14 |
| 4,792,228 | 12/1988 | Haffner | 356/138 |
| 5,337,140 | 8/1994 | Hagiwara et al. | 356/237 |
| 5,343,410 | 8/1994 | Tsujiuchi et al. | 364/525 |
| 5,473,435 | 12/1995 | Masuyuki et al. | 356/372 |

FOREIGN PATENT DOCUMENTS

| | | |
|---|---|---|
| 42 18 382 A1 | 12/1993 | Germany . |
| 904 353 A | 9/1994 | Germany . |

OTHER PUBLICATIONS

Patent Abstracts of Japan, vol. 9, No. 79 (P-347) [1802], Apr. 9, 1985.
Patent Abstracts of Japan, vol. 13, No. 580 (P-980) [3928], Dec. 21, 1989.
French Search Report, 3 pages, dated Mar. 3, 1997.

*Primary Examiner*—Robert Kim
*Attorney, Agent, or Firm*—Marshall, O'Toole, Gerstein, Murray & Borun

[57] ABSTRACT

The present invention relates to a device for determining the shape of the wave surface reflected by a substantially plane component (P), which includes a support (S) for the component (P), an interferometer (I), means for moving the support (S), and a control unit which determines, from the measurements by the interferometer (I), the shape of said wave surface.

According to the invention, the device additionally includes a swivelling mirror (M1), which directs the measurement beam (FM) of the interferometer (I) orthogonally onto a surface (2) of the component (P), and an optical sensor (CO), which determines the position of the image of a light point (PO) of the measurement beam (FM), the orientation of the mirror (M1) being controlled in such a way as to bring the light point (PO) back to a reference position automatically.

8 Claims, 2 Drawing Sheets

DEVICE FOR DETERMINING THE SHAPE OF THE WAVE SURFACE REFLECTED BY A SUBSTANTIALLY PLANE COMPONENT

The present invention relates to a device for determining the shape of the wave surface reflected by a substantially plane component.

More specifically, it is sought to measure the height of minute "asperities" and/or "depressions", for example of the order of a nanometer and more, for periods greater than approximately 0.1 mm over the entire said substantially plane surface.

To do this, the known principle of interferometric measurements is used. According to this principle, light interference is made to occur by the reflections of a measurement light beam, emitted by an interferometer, respectively off the surface of the component to be measured and off a parallel or substantially parallel surface of a reference plate. The interference thus created is manifested in the form of interference fringes which are capable of being measured by the interferometer and are representative of the distance between the two surfaces at the points in question.

Thus, to be able to determine accurately the shape of the wave surface reflected by the component, from such distances, it is necessary for the planarity of the reference plate to be of the order of magnitude of the component to be measured and for the size of said reference plate to be at least equal to that of said surface of the component. In addition, the measurement beam must also have a diameter of at least equivalent size.

The aforementioned physical constraints do not present too many difficulties, especially technical difficulties, as long as the surface of the component to be measured is of small size.

However, as soon as the surface of the component exceeds one or a few hundred millimeters, the tooling necessary for the measurement becomes heavy, bulky, expensive and difficult to use. Thus, in order to measure a surface having a diagonal of 600 mm for example, it is necessary to use an expander for the measurement beam coming from the interferometer several meters in length.

Thus, in order to remedy these drawbacks, a known solution, described especially in an article by Cochran and Creath appearing in the journal "Applied Optics", May 15, 1988, under the title "Combining multiple-subaperture and two-wavelength techniques to extend the measurement limits of an optical surface profiler", recommends using a standard interferometer, the measurement beam diameter of which is small, and taking measurements on a number of measurement areas completely covering said surface, each of said measurement areas being at least partially overlapped, over an overlap sector, by an adjacent measurement area.

The measurements on said overlap sectors are used to fit together the measurements taken on the various adjacent measurement areas, which enables the images of said measurement areas to be joined together in such a way as to obtain an image relating to the entire surface of the component, indicating the shape of the wave surface reflected.

In a known manner, a device for measuring the shape of the wave surface reflected by a substantially plane component, by implementation of the abovementioned known solution, using the measurement of partially overlapping measurement areas, usually includes, as described for example in U.S. Pat. No. 5,343,410:

a support bearing the component to be measured;

an interferometer arranged opposite the reflection surface of the component, capable of emitting a measurement light beam onto a measurement area of said surface and of measuring the interference fringes created by the reflections of said measurement beam, respectively on said surface and on a reference plate arranged so as to be substantially parallel to said surface over the path of said measurement beam;

movement means capable of moving, on the one hand, said support in a first direction of the plane of the component and, on the other hand, said interferometer in a second direction of the plane of the component, orthogonal to said first direction, in such a way as to cause said measurement beam to be scanned over the surface of the component so as to enable said interferometer to take measurements on a number of measurement areas completely covering said surface, each of said measurement areas being at least partially overlapped, over an overlap sector, by an adjacent measurement area; and a control unit which controls said interferometer and said movement means and determines, from the measurements taken by the interferometer on all said measurement areas and according to the aforementioned known principle, the shape of said wave surface reflected by the component.

The known device described above does not enable the measurements to be taken automatically.

This is because this device, which is in particular designed to measure large-sized components as indicated previously, requires a robust and dimensionally tailored support. It is then technically impossible to obtain and maintain precise parallelism over the entire surface, to within a few micrometers, between the reference plate and that surface of the component which is to be measured, the component being borne by this support, especially because of the presence of bending and/or of play at the support and where the component is fixed to the support.

This drawback makes it necessary, before each measurement of a measurement area, to check manually the parallelism between the reference plate and the surface of the component, thereby making the operation lengthy and difficult.

In addition, the aforementioned known device does not enable measurements to be taken by transmission, as is necessary for certain transparent components which have to be measured.

The object of the present invention is to overcome these drawbacks. It relates to a device making it possible to determine, rapidly and accurately, the shape of the wave surface reflected by a component from interferometric measurements which can be taken automatically, whatever the size of said copmonent.

For this purpose, according to the invention, the device which includes:

an interferometer arranged opposite the reflection surface of the component, capable of emitting a measurement light beam onto a measurement area of said surface and of measuring the interference fringes created by the reflections of said measurement beam, respectively off said surface and off a reference plate arranged so as to be substantially parallel to said surface over the path of said measurement beam;

movement means enabling, by their action, said measurement beam to be scanned over the surface of the component so as to enable said interferometer to take measurements on a number of measurement areas completely covering said surface, each of said measurement areas being at least partially overlapped, over an overlap sector, by an adjacent measurement area; and a control unit which controls said interferometer and said movement means and determines, from the measurements taken by said interferometer on all the measurement areas, the shape of said wave surface reflected by the component, the measurements taken on the overlap sectors being used to fit together the measurements taken on the corresponding adjacent measurement areas, is noteworthy in that it additionally includes:

a first swivelling mirror arranged in the path of the measurement beam between the interferometer and the component in such a way as to direct said measurement beam orthogonally, by reflection, onto the surface of said component; and an optical sensor capable of determining the position of the image of a light point of the measurement beam, reflected by the surface of the component, said light point being located at a predefined reference position and the orientation of said first mirror being controlled in such a way as to bring the position of the image of the light point, determined by the optical sensor, back to said reference position automatically.

Thus, by virtue of the automatic control of said first mirror, the parallelism necessary for the measurement is accurately adjusted in operating time, which avoids having to adjust this parallelism before each measurement of a measurement region.

Consequently, the determination of the shape of the wave surface reflected by the component may be carried out rapidly and accurately.

Advantageously, the orientation of said first mirror is controlled by the control unit which receives the measurements taken by said optical sensor, for example a camera of the CCD type.

In addition, said optical sensor is preferably integrated into the interferometer.

Furthermore, in order to optimize the processing, the orientation of said first mirror may be refined, before each measurement of a measurement region, on the basis of the processing of interference fringes measured by the interferometer.

In one particularly advantageous embodiment of the invention, the device according to the invention is produced in such a way as also to be able to determine the shape of the wave surface transmitted by a transparent component. For this purpose, according to the invention, the support is made, at least on the part bearing said component, in such a way as to let the measurement light beam emitted by the interferometer and transmitted by said transparent component pass through it, and said device according to the invention additionally includes a second swivelling mirror which is arranged on the side opposite the interferometer with respect to the support and to the component and which is placed in the path of the measurement beam emitted by the interferometer and transmitted along a transmission direction by the component and the support, said second mirror being arranged approximately orthogonally to said transmitted measurement beam and being oriented in such a way as to send said measurement beam back in said transmission direction.

The device in accordance with the latter embodiment therefore makes possible both reflection and transmission measurements.

Of course, said second mirror may be oriented manually. However, preferably, the orientation of said second mirror is controlled automatically by said control unit.

Moreover, advantageously, the device according to the invention includes a removable plate, having dimensions at least equal to the amounts of travel of the support, mounted on the support and provided with a number of characteristic elements, the effective positions of which are known and are capable of being measured by the interferometer, the comparisons respectively between the positions measured by the interferometer and the known effective positions of these characteristic elements making it possible to determine the precise relative position between the support and the measurement beam emitted onto the component.

The figures of the appended drawing will make it clear how the invention can be realized. In these figures, identical references denote similar elements.

Figure 1:
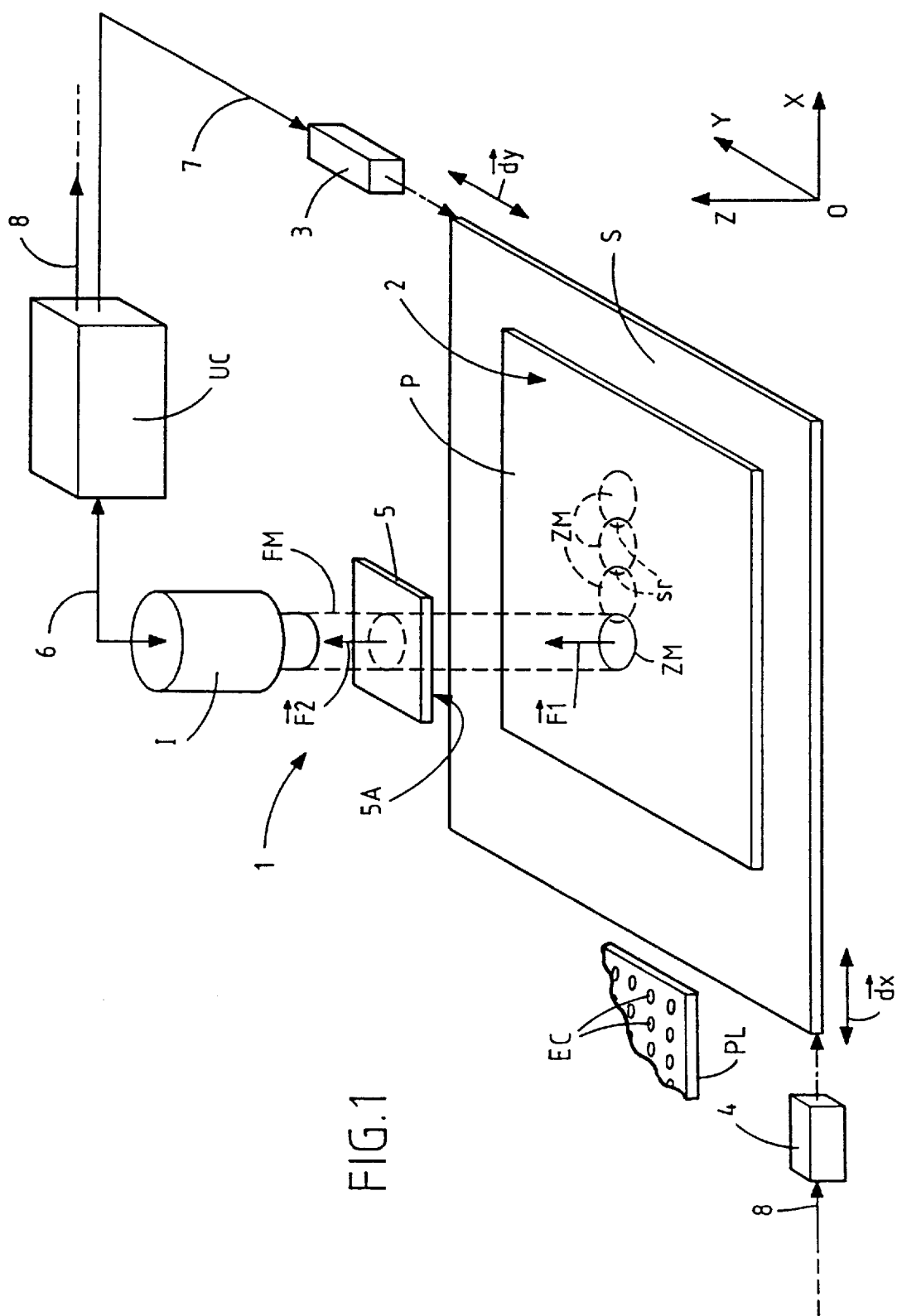
FIG. 1 shows diagrammatically a device for determining the shape of the wave surface reflected by a component from interferometric measurements.

The device 1 according to the invention and shown in FIG. 1 is intended to determine the shape of the wave surface reflected by a substantially plane and reflecting component P.

More specifically, said device 1 is designed to measure the height of minute "asperities" and/or "depressions", not shown, in the surface in the direction OZ orthogonal to the plane OXY of the component P.

For this purpose, said device 1 includes, in a known manner:

a moveable support S of plane general shape, bearing said component P and capable of being moved in the plane OXY by movement means 3 and 4, as detailed below;

an interferometer I, of the usual type, fixed to a support, not shown, opposite a surface 2 of the component P and capable of emitting a measurement light beam FM onto a measurement area ZM of said surface 2 and of measuring the interference fringes created by the reflections of said measurement beam FM, respectively off the surface 2, as illustrated by an arrow $\vec{F1}$, and off the face 5A of a transparent reference plate 5 designed so as to be substantially parallel to the surface 2 in the path of the measurement beam FM, as illustrated by an arrow $\vec{F2}$. The interference fringes thus created are representative of the distance between the reflection face 5A of the reference plate 5 and the corresponding measurement area ZM of the surface 2;

said movement means 3 and 4, produced for example in the form of screws and a motor or a belt and a notched pulley, which are capable of moving the support S respectively along the direction OX, as illustrated by a double arrow $\vec{dx}$, and along the direction OY, as illustrated by a double arrow $\vec{dy}$. Moving the support S then enables, by means of the interferometer I, measurements to be taken on a number of measurement areas ZM (only a few of these have been shown in FIG. 1) completely covering said surface 2, each of said measurement areas ZM being at least partially overlapped, over an overlap sector sr, by an adjacent measurement area. The measurements taken on said overlap sectors sr enable the measurements taken on the corresponding adjacent measurement areas to be fitted together; and a control unit UC which controls said interferometer I, as illustrated by a link 6, and said movement means, 3 and 4, as illustrated respectively by links 7 and 8, and which determines, from the measurements taken by the interferometer I on all said measurement areas ZM (and therefore also on the overlap sectors sr), the shape of the wave surface reflected by the component P.

Within the context of the invention, the movement means may also be produced in such a way as:

to move the measurement beam with respect to the fixed support, either by a direct movement of the interferometer or by a deflection of the measurement beam, for example by means of a set of movable mirrors; or to move the support in a first direction in the OXY plane and the interferometer in a second direction in said OXY plane, orthogonal to said first direction.

It is known that, in order to obtain accurate measurements, it is necessary to have very good parallelism between the face 5A of the reference plate 5 and the surface 2 of the component P. However, particularly because of the existence of bending and/or clearances at the support S, as well as at the point, not shown, where the component P is fixed to the support S, this existence is not satisfactory, above all in the case of large-sized supports.

In order to remedy this drawback, one (not very satisfactory) solution consists in manually adjusting said parallelism before the measurement of each measurement region ZM, which means an expensive and lengthy operation (adjustment time and thermal stabilization time).

Figure 2:
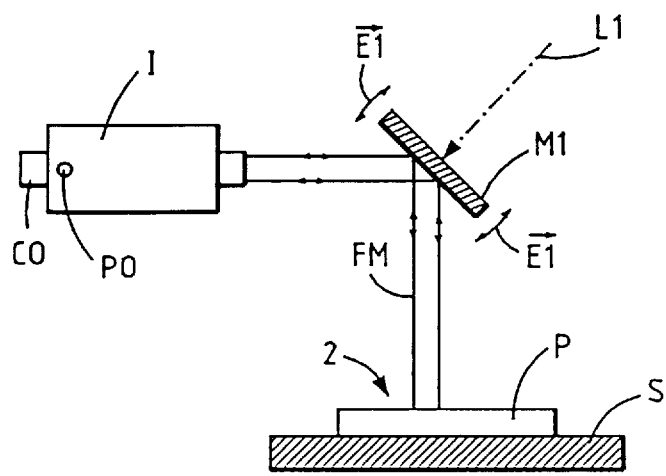
FIG. 2 illustrates diagrammatically the essential characteristics of the device according to the invention.

The device 1 according to the invention is intended to remedy these drawbacks. For this purpose, it includes, according to the invention, as shown in FIG. 2, in addition to the aforementioned elements:

a swivelling mirror M1, as indicated by arrows $\vec{E1}$ which is arranged in the path of the measurement beam FM between the interferometer I which is suitably placed and the component P, in such a way as to direct, by reflection, said measurement beam FM orthogonally onto the surface 2 of said component P; and an optical sensor CO integrated into the interferometer I and capable of determining the position of the image of a light point PO, shown diagrammatically, of the measurement beam FM, reflected by the surface 2 of the component P, said light point PO being located at a predefined reference position and the orientation of said mirror M1 being controlled in such a way as to bring the position of the image of the light point PO, determined by the optical sensor CO, back to said reference position automatically.

Said mirror M1 is controlled, automatically and in operating time, as indicated by a link L1, using a control means, preferably the control unit UC, which determines in real time the control commands for said mirror M1 on the basis of the measurements taken by said optical sensor CO which may be a camera of the CCD type.

Thus, by virtue of the automatic and continuous control of said mirror M1, the parallelism necessary for the measurement of a component P is accurately adjusted in operating time.

In the embodiment shown in FIG. 2, the device 1 according to the invention only allows measurements to be taken by reflection of the measurement beam FM off the component P.

Figure 3:
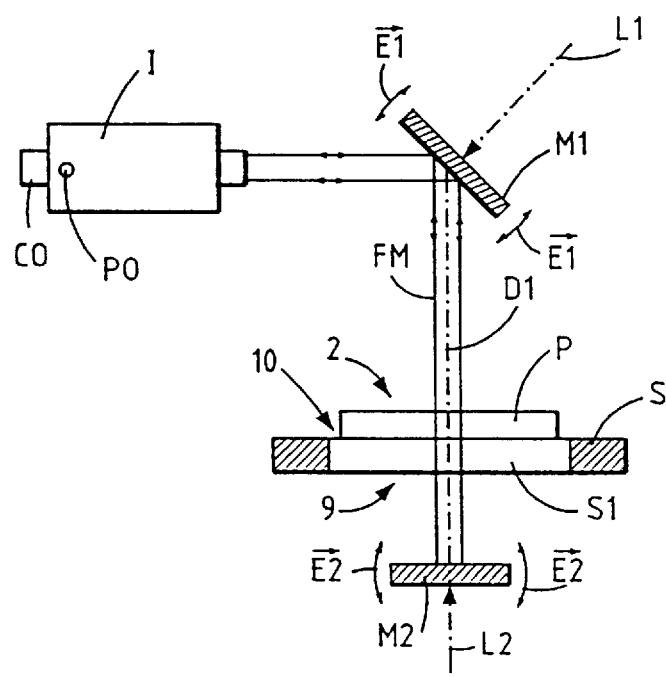
FIG. 3 shows diagrammatically a device according to the invention in a particular embodiment allowing both reflection and transmission measurements of the measurement beam.

Shown diagrammatically in FIG. 3 is another embodiment which, in addition to measurements by reflection, also allows measurements by transmission of the measurement beam FM through a transparent component P (for said measurement beam FM).

In this case, the device according to the invention has the following characteristics:

the support S is made, on a part S1 corresponding at least to the part bearing the component P, in such a way as to let the measurement light beam FM, emitted by the interferometer I and transmitted by said component P which is transparent, pass through it; and said device additionally includes a swivelling mirror M2, as indicated by arrows $\vec{E2}$, which is arranged opposite that face 9 of the support S which is opposite that 10 bearing the component P, and which is placed in the path of the measurement beam FM emitted by the interferometer I and transmitted along a transmission direction D1 by the component P and the support S, said mirror M2 being arranged approximately orthogonally to said transmitted measurement beam FM and being oriented in such a way as to send said beam FM back in said transmission direction D1.

Thus, because the mirror M2 sends the light beam FM back to the interferometer I, the interferometric measurements necessary for implementing the invention may be taken.

In addition, by accurately orienting said mirror M2, any problem of a defect in parallelism in the device 1 is avoided since the movements of the component P do not affect the direction of propagation of the light beam passing through the component.

The mirror M2, whose orientation is controlled by a link L2 connected, for example, to the control unit UC (not shown in FIGS. 2 and 3), is preferably motor-driven, but not automated, so as to be able to adjust the collimation remotely, before the measurements, without thereby disturbing the thermal equilibrium of the device 1.

Consequently, the device in FIG. 3 can take:

either measurements in transmission mode, for which the mirror M2 is used to adjust the collimation and the mirror M1 to direct the measurement beam FM onto the component P;

or measurements in reflection mode, for which the mirror M1 performs the collimation and the mirror M2 is not used.

The device 1 according to the invention additionally includes a removable plate PL, shown partially in FIG. 1, having dimensions at least equal to the amounts of travel of the support S. This removable plate PL, which is capable of being mounted on the support S, is provided with a number of characteristic elements EC, the effective positions of which are known and are capable of being measured by the interferometer. In the example shown, said characteristic elements EC are holes, for example 5 mm in diameter, which are spaced apart by 20 to 25 mm in the plane of the removable plate PL. The comparisons respectively between the positions measured by the interferometer I and the known effective positions of these characteristic elements EC make it possible to determine the precise relative position between the support S and the measurement beam FM emitted onto the component P.

I claim:

1. A device for determining the shape of the wave surface reflected by a substantially plane component (P), said device (1) including:

a support (S) bearing said component (P)

an interferometer (I) arranged opposite the surface of reflection (2) of the component (P), capable of emitting a measurement light beam (FM) onto a measurement area (ZM) of said surface (2) and of measuring the interference fringes created by the reflections of said measurement beam (FM), respectively on said surface (2) and on a reference plate (5) arranged so as to be substantially parallel to said surface (2) over the path of said measurement beam (FM);

movement means (3, 4) enabling, by their action, said measurement beam (FM) to be scanned over the surface (2) of the component so as to enable said interferometer (I) to take measurements on a number of measurement areas (ZM) completely covering said surface (2), each of said measurement areas (ZM) being at least partially overlapped, over an overlap sector (sr), by an adjacent measurement area; and a control unit (UC) which controls said interferometer (I) and said movement means (3, 4) and determines, from the measurements taken by said interferometer (I) on all the measurement areas (ZM), the shape of said wave surface reflected by the component (P), the measurements taken on the overlap sectors (sr) being used to fit together the measurements taken on the corresponding adjacent measurement areas (ZM), wherein it additionally includes:

a first swivelling mirror (M1) arranged in the path of the measurement beam (FM) between the interferometer (I) and the component (P) in such a way as to direct said measurement beam (FM) orthogonally, by reflection, onto the surface (2) of said component (P); and an optical sensor (CO) capable of determining the position of the image of a light point (PO) of the measurement beam (FM), reflected by the surface (2) of the component (P), said light point (PO) being located at a predefined reference position and the orientation of said first mirror (M1) being controlled in such a way as to bring the position of the image of the light point (PO), determined by the optical sensor (CO), back to said reference position automatically.

2. The device as claimed in claim 1, wherein the orientation of said first mirror (M1) is controlled by the control unit (UC) which receives the measurements taken by said optical sensor (CO).

3. The device as claimed in claim 1, wherein said optical sensor (CO) is integrated into the interferometer (I).

4. The device as claimed in claim 1, wherein, before each measurement of a measurement area (ZM), the orientation of said first mirror (M1) is refined on the basis of the processing of interference fringes measured by the interferometer (I).

5. The device as claimed in claim 1, capable of determining the shape of the wave surface transmitted by a substantially parallel-faced transparent component (P) for the measurement light beam (FM), wherein said support (S) is made, at least on the part bearing said component (P), in such a way as to let the measurement light beam (FM) emitted by the interferometer (I) and transmitted by said transparent component (P) pass through it, which device (1) additionally includes a second swivelling mirror (M2) which is arranged on the side opposite the interferometer (I) with respect to the support (S) and to the component (P) and which is placed in the path of the measurement beam (FM) emitted by the interferometer (I) and transmitted along a transmission direction (D1) by the component (P) and the support (S), said second mirror (M2) being arranged approximately orthogonally to said transmitted measurement beam (FM) and being oriented in such a way as to send said measurement beam (FM) back in said transmission direction (D1).

6. The device as claimed in claim 5, wherein the orientation of said second mirror (M2) is controlled by said control unit (UC).

7. The device as claimed in claim 1, which includes a removable plate (PL), having dimensions at least equal to the amounts of travel of the support (S), mounted on the support (S) and provided with a number of characteristic elements (EC), the effective positions of which are known and are capable of being measured by the interferometer (I), the comparisons respectively between the positions measured by the interferometer (I) and the known effective positions of these characteristic elements (EC) making it possible to determine the relative position between the support (S) and the measurement beam (FM) emitted onto the component (P).

8. The device as claimed in claim 7, wherein said characteristic elements (EC) are holes made in the removable plate (PL).

* * * * *

UNITED STATES PATENT AND TRADEMARK OFFICE
CERTIFICATE OF CORRECTION

PATENT NO. : 5,838,442
DATED : November 17, 1998
INVENTOR(S) : Michael Bray

It is certified that error appears in the above-indentified patent and that said Letters Patent is hereby corrected as shown below:

ON THE TITLE PAGE:

In Area [73] Assignee, please insert --Le Commissariat A L'Energie Atomique, Paris, France --

Signed and Sealed this

Fifth Day of October, 1999

*Attest:*

Q. TODD DICKINSON

*Attesting Officer*     *Acting Commissioner of Patents and Trademarks*